United States Patent
Goldthwaite et al.

(10) Patent No.: US 8,161,531 B2
(45) Date of Patent: *Apr. 17, 2012

(54) SYSTEM AND METHOD FOR MANAGING ELECTRONIC COMMUNICATIONS

(75) Inventors: Flora P. Goldthwaite, Seattle, WA (US); Jonathan Cluts, Sammamish, WA (US); Pamela J. Heath, Seattle, WA (US); David W. Baumert, Sammamish, WA (US); Sven Pleyer, Woodinville, WA (US); Aaron F. Woodman, Seattle, WA (US); Immaneni Ashok, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/819,789

(22) Filed: Jun. 21, 2010

(65) Prior Publication Data

US 2010/0255815 A1   Oct. 7, 2010

Related U.S. Application Data

(63) Continuation of application No. 10/602,686, filed on Jun. 25, 2003, now Pat. No. 6,865,893.

(51) Int. Cl.
   *H04L 9/32* (2006.01)
(52) U.S. Cl. ...... 726/4; 455/412.1; 455/414.4; 455/416; 709/206; 709/207; 379/88.22
(58) Field of Classification Search .................. 726/4, 6; 713/152, 168, 170, 182, 185; 709/204, 205, 709/223, 224, 227, 238; 455/26.1, 411, 412.1, 455/412.2, 414.4, 415, 416; 379/88.22, 202.01
See application file for complete search history.

(56) References Cited

U.S. PATENT DOCUMENTS

| 5,493,692 | A | | 2/1996 | Theimer et al. | |
|---|---|---|---|---|---|
| 5,689,642 | A | | 11/1997 | Harkins et al. | |
| 5,928,325 | A | * | 7/1999 | Shaughnessy et al. | 709/206 |
| 6,311,210 | B1 | * | 10/2001 | Foladare et al. | 709/206 |
| 6,359,970 | B1 | * | 3/2002 | Burgess | 379/67.1 |

(Continued)

OTHER PUBLICATIONS

Notice of Allowance mailed Mar. 22, 2010 in U.S. Appl. No. 10/602,626.

(Continued)

*Primary Examiner* — Nasser Goodarzi
*Assistant Examiner* — Shanto M Abedin
(74) *Attorney, Agent, or Firm* — Shook Hardy & Bacon LLP

(57) ABSTRACT

A method and system are provided for allowing a user to efficiently manage communications. A system for allowing a user having a unique identity is provided, wherein the unique identity is associated with a plurality of electronic devices. The system includes a service for assigning a reference to a user's unique identity, wherein other identities can access the user's unique identity only by using the reference. The system additionally includes permission controls for allowing the user to control access to the unique identity by restricting authorization to a selected set of other identities. Groups of individuals may receive different levels of authorization such that some individuals may be authorized to make live contact and others may be required to leave a message. Preference controls allow the system user to select at least one associated device from a plurality of associated devices for receiving communication upon an access attempt by an authorized user. The preference controls also allow a system user to select a preferred mode of receiving communication such as audio, video or text modes.

17 Claims, 7 Drawing Sheets

U.S. PATENT DOCUMENTS

| | | | |
|---|---|---|---|
| 6,526,129 B1* | 2/2003 | Beaton et al. | 379/90.01 |
| 6,631,398 B1* | 10/2003 | Klein | 709/206 |
| 6,714,519 B2 | 3/2004 | Luzzatti et al. | |
| 6,751,297 B2 | 6/2004 | Nelkenbaum | |
| 6,766,002 B1 | 7/2004 | Cannon et al. | |
| 6,839,410 B2* | 1/2005 | Infosino | 379/88.02 |
| 6,895,257 B2* | 5/2005 | Boman et al. | 455/556.1 |
| 7,054,621 B2 | 5/2006 | Kennedy | |
| 7,099,304 B2 | 8/2006 | Liu et al. | |
| 7,139,806 B2 | 11/2006 | Hayes et al. | |
| 7,143,356 B1 | 11/2006 | Shafrir et al. | |
| 7,162,640 B2 | 1/2007 | Heath et al. | |
| 7,164,936 B2* | 1/2007 | Heatley | 455/566 |
| 7,177,403 B2 | 2/2007 | Meyerson et al. | |
| 7,216,143 B2 | 5/2007 | Creamer et al. | |
| 7,240,298 B2 | 7/2007 | Grossman et al. | |
| 7,260,715 B1 | 8/2007 | Pasieka | |
| 7,496,628 B2* | 2/2009 | Arnold et al. | 709/206 |
| 7,512,655 B2* | 3/2009 | Armstrong et al. | 709/205 |
| 7,631,062 B2* | 12/2009 | Motoyama | 709/223 |
| 7,639,157 B1* | 12/2009 | Whitley et al. | 340/870.02 |
| 7,710,945 B2* | 5/2010 | Jonsson | 370/352 |
| 7,774,823 B2* | 8/2010 | Goldthwaite et al. | 726/2 |
| 2002/0128033 A1* | 9/2002 | Burgess | 455/528 |
| 2002/0149705 A1* | 10/2002 | Allen et al. | 348/734 |
| 2003/0031304 A1 | 2/2003 | Heatley et al. | |
| 2003/0041048 A1* | 2/2003 | Balasuriya | 707/1 |
| 2003/0050096 A1* | 3/2003 | Heatley | 455/560 |
| 2003/0065779 A1* | 4/2003 | Malik et al. | 709/225 |
| 2003/0078033 A1* | 4/2003 | Sauer et al. | 455/412 |
| 2003/0104805 A1* | 6/2003 | Weksel | 455/414 |
| 2004/0010549 A1 | 1/2004 | Matus et al. | |
| 2004/0073643 A1 | 4/2004 | Hayes et al. | |
| 2004/0100974 A1* | 5/2004 | Kreiner et al. | 370/401 |
| 2004/0148506 A1 | 7/2004 | Prince | |
| 2004/0187013 A1 | 9/2004 | Heath et al. | |
| 2004/0248560 A1 | 12/2004 | Bedingfield et al. | |
| 2007/0240081 A1 | 10/2007 | Grossman et al. | |

OTHER PUBLICATIONS

Office Action mailed Jul. 21, 2009 in U.S. Appl. No. 10/602,626.
Office Action mailed Dec. 3, 2008 in U.S. Appl. No. 10/602,626.
Office Action mailed May 28, 2008 in U.S. Appl. No. 10/602,626.
Office Action mailed Nov. 1, 2007 in U.S. Appl. No. 10/602,626.
Office Action mailed May 2, 2007 in U.S. Appl. No. 10/602,626.
Office Action mailed Nov. 12, 2006 in U.S. Appl. No. 10/602,626.

* cited by examiner

SYSTEM AND METHOD FOR MANAGING ELECTRONIC COMMUNICATIONS

CROSS-REFERENCE TO RELATED APPLICATION

This is a continuation application of application Ser. No. 10/602,626, filed Jun. 25, 2003, the entirety of which is incorporated by reference herein.

BACKGROUND OF THE INVENTION

The number of techniques for managing electronic communications has increased rapidly over recent years. Voice communications such as telephone communications are typically managed electronically within both homes and businesses, such that answering machines, voice mail systems, and call forwarding mechanisms handle calls when no one is physically present to accept the calls. Occasionally, a recording will provide a calling party with a pager number in order to reach an individual more promptly. Similarly to voice communications, text communications may also be received instantaneously through text messaging techniques on mobile devices or through email accounts using instant messaging when a person is present to receive the communications. Typically however, email communications remain in queue until a recipient logs into an email account to check messages.

Even when a recipient is present to receive voice or text communications, the recipient may want to receive the communications only from selected individuals and may want to avoid sales calls, spam messages, or communications from individuals unknown to the recipient. Caller ID is frequently used to assist a telephone user in determining which calls to accept. Additionally, various filtering systems have been developed to appropriately handle email from unknown addresses.

In order to initiate contact using either a voice method or a text method, a sender must locate an email address or telephone number referencing the targeted recipient. A current storage structure for such information is a database field entry such as those used for storing contacts in electronic mail programs. An alternative structure is a listing, such as a web page or a phone book having a list of telephone numbers. These storage techniques often result in out-of-date information and lack of individual control over the stored information.

The aforementioned techniques for handling electronic communications do not provide an overall management scheme. Typically, individuals possess many electronic devices for receiving various types of information electronically. These devices include for example: cellular telephones; home telephones; office telephones; pagers; and personal computers. It would be desirable for individuals to have control over which entities are authorized to communicate with them and over which devices such communication would be authorized at any given time. Accordingly, there is a need for a solution, which allows increased individual control over electronic contacts. There is also a need for a comprehensive approach for managing incoming communications and outgoing communications.

SUMMARY OF THE INVENTION

In one aspect, the present invention is directed to a method for facilitating electronic communications management capability. The method provides a technique for managing a unique identity owned by an identity owner, wherein the unique identity is accessible through an associated reference. The method includes providing identity access tools for allowing the identity owner to select a set of authorized identities that have rights to communicate with the identity owner and providing device selection tools for allowing the identity owner to select at least one electronic device for reception of communications.

In a further aspect, a method is provided for facilitating electronic communications management by a system user. The method includes permitting access to a unique identity of the system user through a unique reference, wherein the unique identity comprises a plurality of components. The method additionally includes allowing the system user to alter any one of the identity components without altering the reference and providing the system user with tools for regulating access to the identity components such that selected known identities have access to selected identity components.

In yet another aspect, a system is provided for allowing a system user to manage communications with a unique identity, wherein the unique identity is associated with a plurality of electronic devices. The system includes a service for assigning a reference to a user's unique identity, wherein other identities can access the user's unique identity only by using the reference. The system additionally includes permission controls for allowing the user to control access to the unique identity by restricting authorization to a selected set of other identities and preference controls for allowing the user to select at least one associated device from a plurality of associated devices for receiving communication upon an access attempt by an authorized user.

BRIEF DESCRIPTION OF THE DRAWINGS

The present invention is described in detail below with reference to the attached drawing figures, wherein.

DETAILED DESCRIPTION OF THE INVENTION

Figure 1:
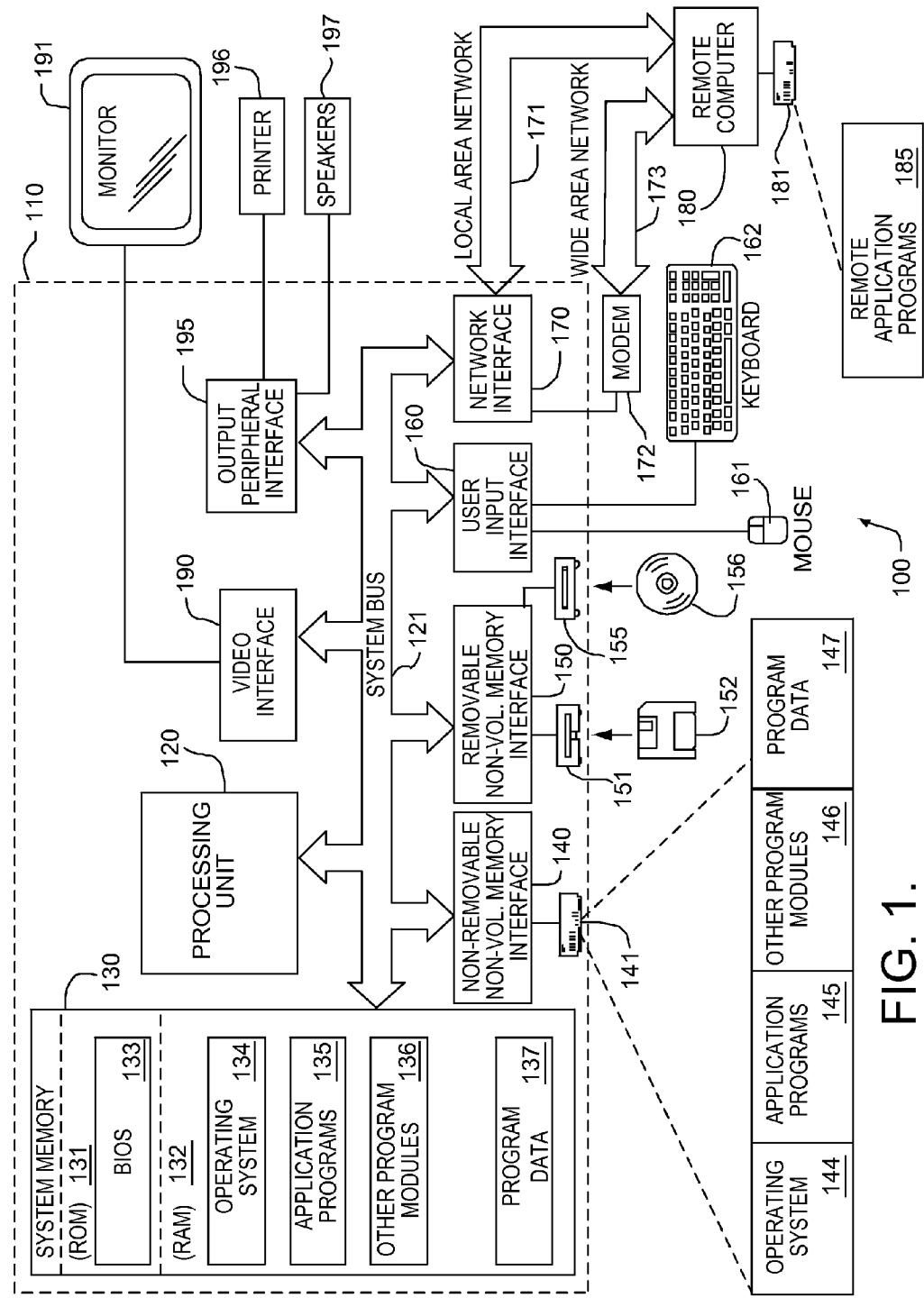
FIG. 1 is a block diagram of a suitable computing system environment for use in implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Figure 2:
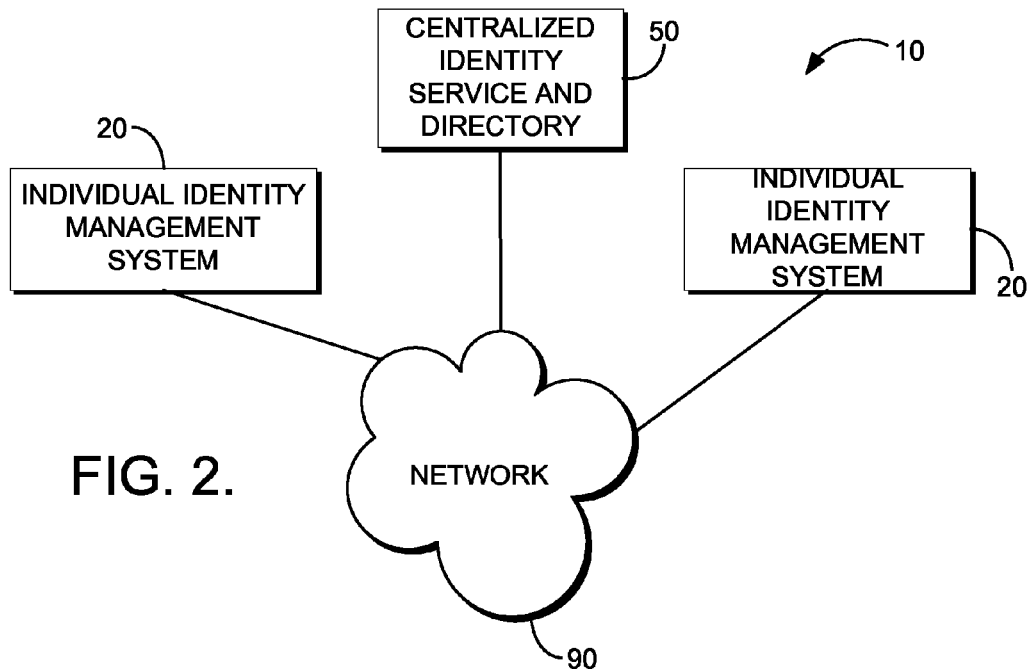
FIG. 2 is a block diagram showing a system of the invention.

FIG. 2 is a block diagram showing a system 10 in accordance with an embodiment of the invention. A centralized identity service 50 and a plurality of individual identity management systems 20 communicate over a network 90. The network 90 may be of any type described above with reference to FIG. 1.

Figure 3:
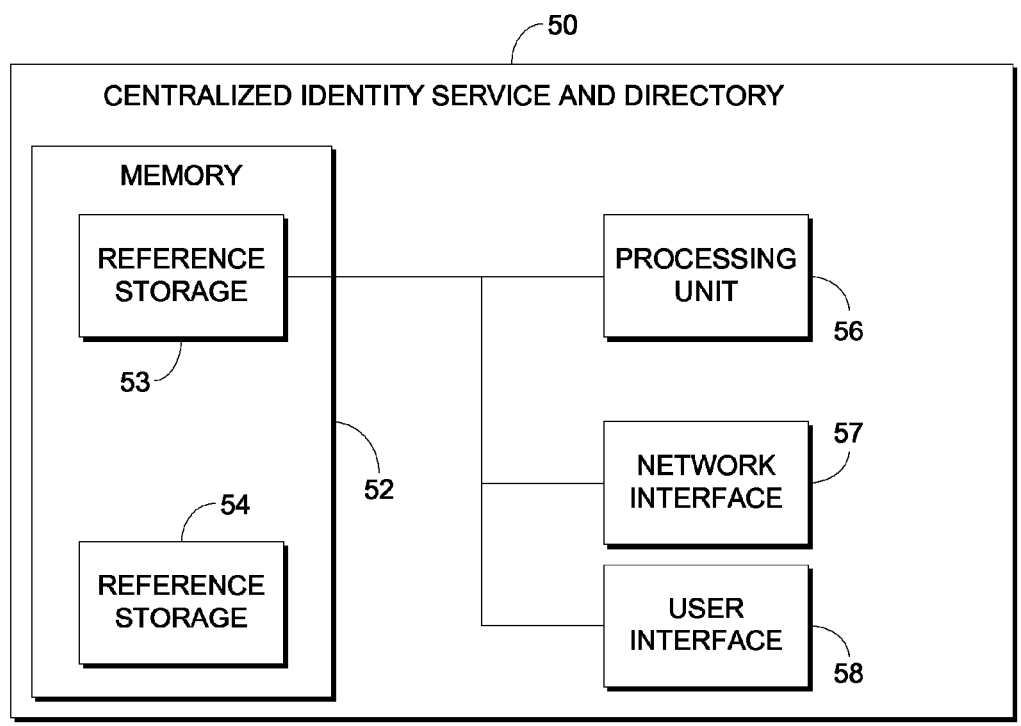
FIG. 3 is a block diagram illustrating a centralized identity service in accordance with an embodiment of the invention.

FIG. 3 illustrates components of the centralized identity service 50 in accordance with an embodiment of the invention. The identity service 50 may be implemented using any type of computer as described above with reference to FIG. 1. Regardless of the particular type of computerized device employed, the identity service 50 may include a memory 52, a processing unit 56, a network interface 57, and a user interface 58. Although it is likely that the identity service would include a plurality of memory storage devices, the generalized memory 52 is shown for simplification. The memory 52 includes a reference creation module 54 and a reference storage area 53. The reference creation module 54 is capable of creating a unique reference in order to access each unique identity. Individuals having a unique identity visit the centralized identity service and directory 50 to receive a reference to the unique identity. Reference storage area 53 stores the unique references in a directory upon creation of the reference. The references stored in reference storage area 53 serve as an index to each unique identity.

The reference created by the centralized identity service 50 may be any type of reference, such as an alphanumeric indicator. The reference serves as a pointer to the unique identity created by the identity owner. The identity itself can include any number of components that the identity owner wants other system users to access. Although the present system is directed to electronic communications management, the identity may include personal data such as photographs, home address, birthday, hobbies, occupation or any information the identity owner would like to allow other system users to access.

Figure 4:
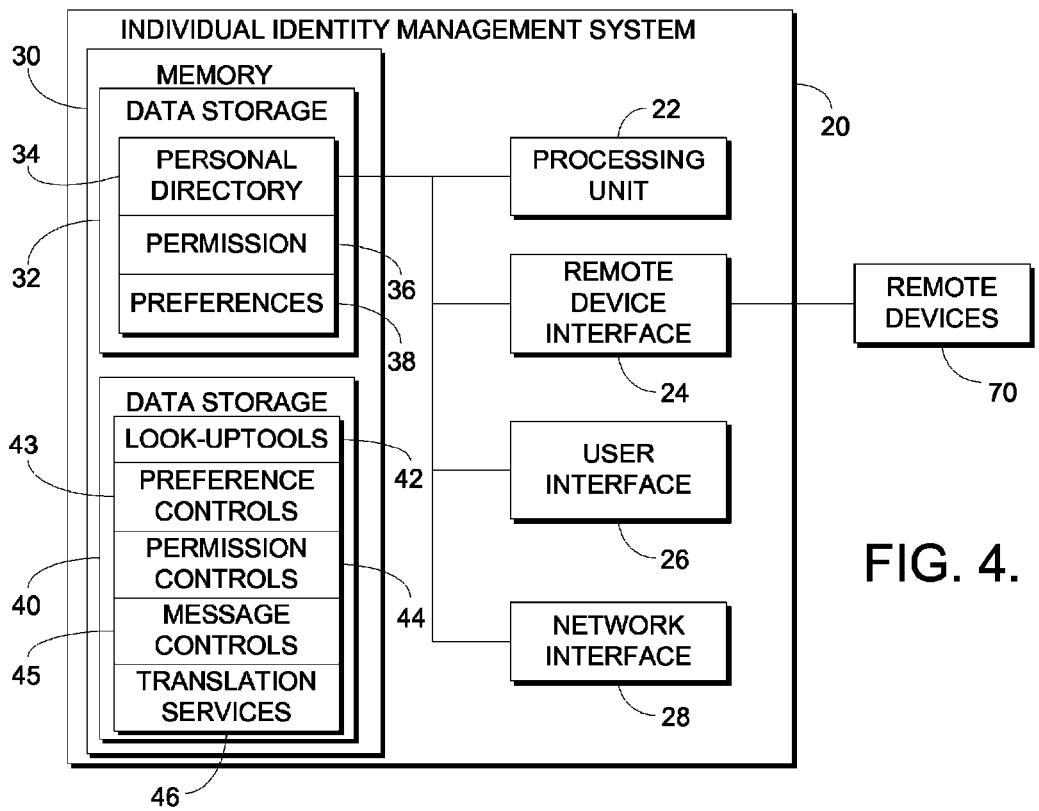
FIG. 4 is a block diagram illustrating an individual identity management system in accordance with an embodiment of the invention.

FIG. 4 illustrates an individual identity management system 20 in accordance with an embodiment of the invention. The individual identity management system 20 may include a processing unit 22, a remote device interface 24 for communicating with remote devices 70, a user interface 26, and a network interface 28. The individual identity management system 20 may also include a memory device 30 have a data storage section 32 and a control modules storage section 40.

Figure 8:
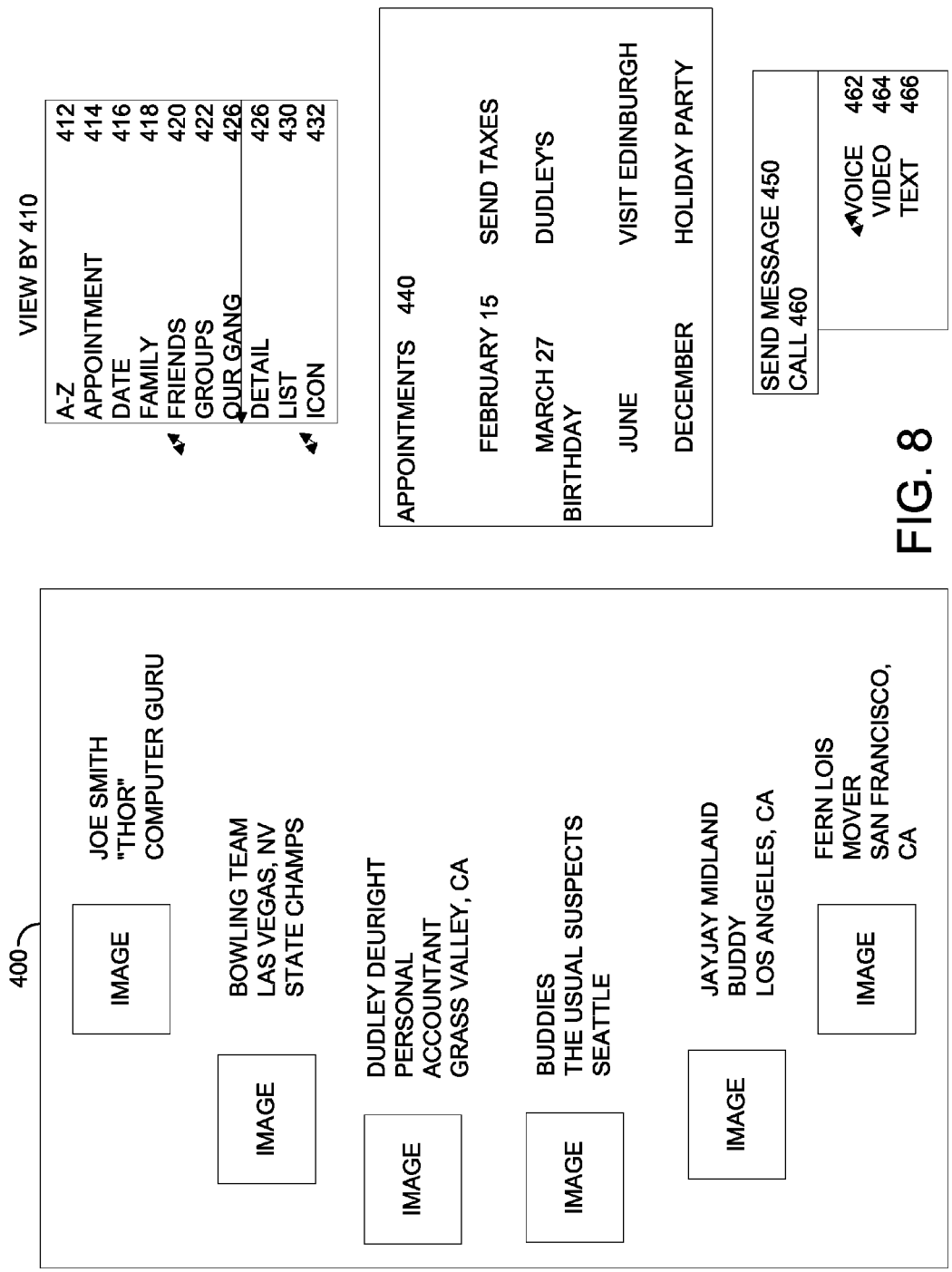
FIG. 8 shows an embodiment of a user interface provided for the individual identity management system.

The data storage section 32 may store a personal directory 34, permissions 36, and preferences 38. The personal directory 34 may be established by a system user to include a plurality of contacts. These contacts give the system user the ability to access and possess information about other system users and allow the system user to access identities of other system users. FIG. 8, which will be further described below, shows an exemplary user interface that displays information that might be contained within the personal directory 34. The permissions 36 include authorizations for various contacts stored in the personal directory 34. A system user may give other system users permission to communicate live in real time, permission to leave a message, or may deny permission to communicate. The permissions 36 may also include limitations on times and methods of communication. The system user may set the preferences 38 to select modes, devices, or times for receiving live communications and modes and devices for receiving messages.

The control modules 40 may include look-up tools 42 to assist system users in looking up contacts stored in the personal directory 34 or in looking up references stored in the centralized identity service 50. Preference controls 43 set preferences 38 such as default settings for delivery methods, modes, devices, and times as described above. A user interface for utilizing the preference controls 43 is described below with reference to FIG. 6. Permission controls 44 assist the system user in setting permissions 36. A user interface showing an embodiment of the permission controls 44 is described below in conjunction with FIG. 7.

Transmission controls 45 assist a system in transmitting communications to other system users. The transmission controls 45 allow a system user to select a delivery method such as "live" or "message" and a mode, such as video, audio, or text. If the system user sends a message, the transmission controls 45 allow the system user to maintain control over the message until the receiver reads or hears the message. Using the transmission controls 45, the sender can retract the message if it is time sensitive. The receiver will be unaware that the message was ever sent. A user interface for transmitting communications is further described below with reference to FIG. 8.

Translation services 46 translate the communication if a receiver has restricted the sender to a mode different from the one selected by the sender. For instance if the sender wants to send an email message, but the receiver has elected to receive the sender's communications by voice mail, the translation services 46 will translate the message from text to audio or email to voice mail.

Figure 5:
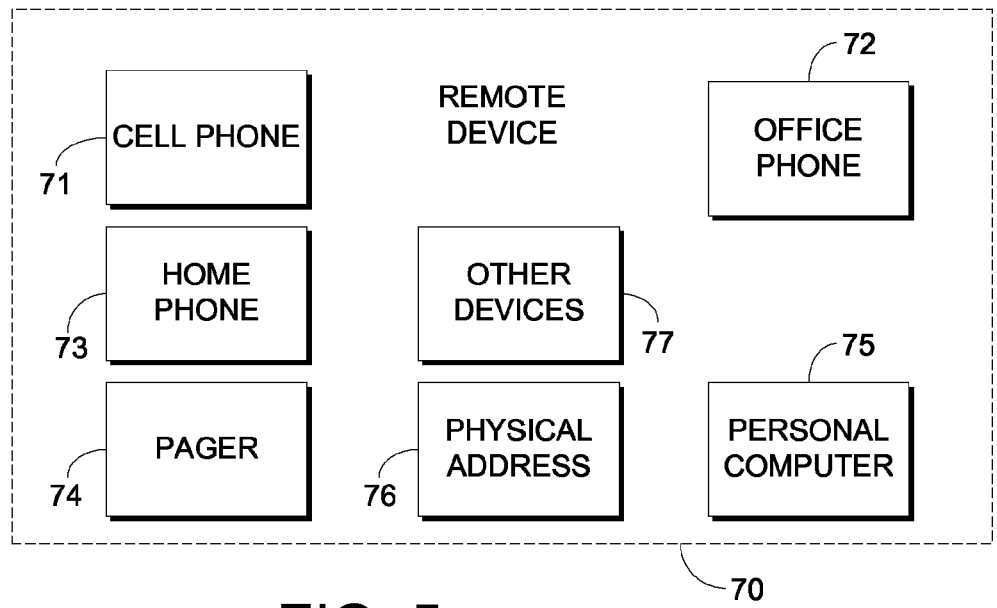
FIG. 5 is a block diagram illustrating remote devices associated with the individual identity management system in accordance with an embodiment of the invention.

FIG. 5 further illustrates the types of remote devices 70 that might be connected with the individual identity management system 20. The references created by the centralized identity service and directory 50 can be used by a system user to reach another system user at any of the remote devices 70 authorized by the system user and connected with individual identity management system 20. The remote devices 70 may include a cellular telephone 71, an office telephone 72, a home telephone 73, a pager 74, a personal computer 75, a physical address 76, or other devices 77. The one unique reference created by the centralized identity service 50 may be provided as the sole reference for accessing all of the remote devices 70 such that no individual numbers are necessary or available for the remote devices 70.

Figure 6:
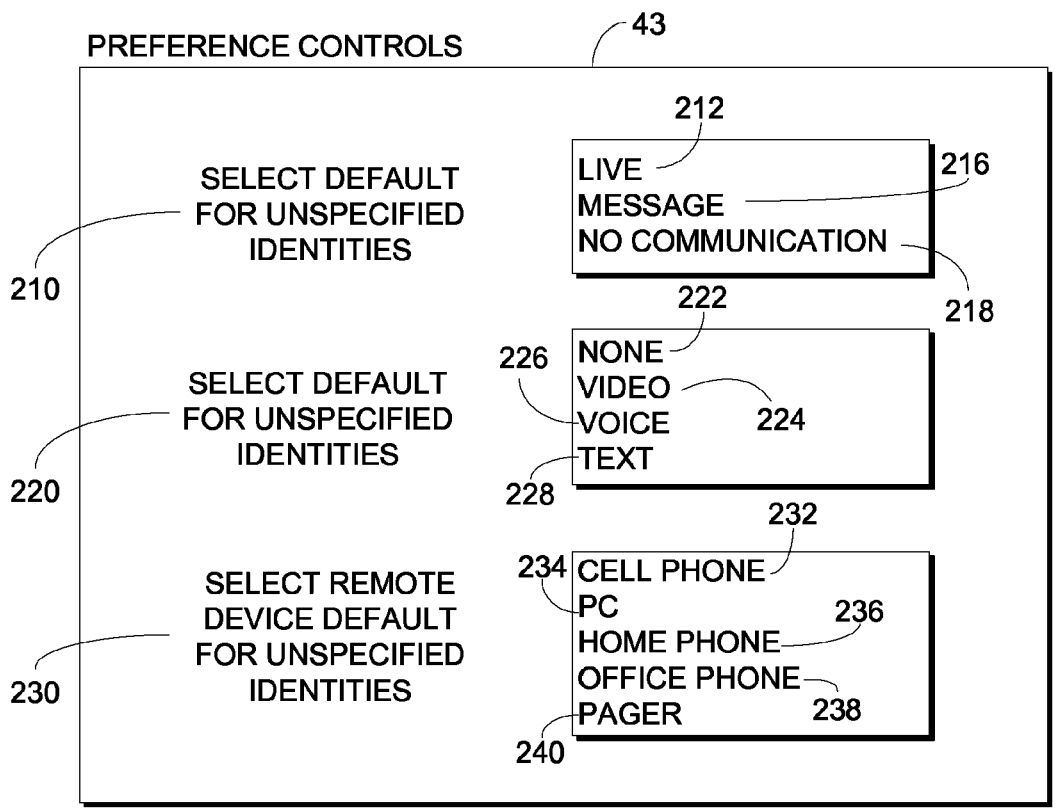
FIG. 6 is a block diagram illustrating preference controls of the individual identity management system in accordance with an embodiment of the invention.

FIG. 6 illustrates a sample user interface for selecting preference controls 43. A section 210 may be provided for selecting a default for communication delivery. A system user may select live delivery 212, message delivery 216, or no communication 218. Using these selections, a first system user may allow other system users to contact him directly using the live delivery option 212 via a live method such as instant messaging or a telephone call. Alternatively, the first system user may be occupied and may not want to receive any live communications. In this instance, the first system user may select a default such as message delivery 216, such that other system users may contact the first system user only by leaving a message. The message may be a voice mail message, an email message, or any other type of non-live communication such as the mailing of a notification to the first system user. A default mode selection option 220 may also be provided. The first system user may select video mode 224, voice mode 226, or text mode 228, or any other available mode 222. A remote device selection option 230 allows the first system user to direct other system users to a desired remote device such as a cell phone 232, a PC 234, a home phone 236, an office phone 238, or a pager 240.

Figure 7:
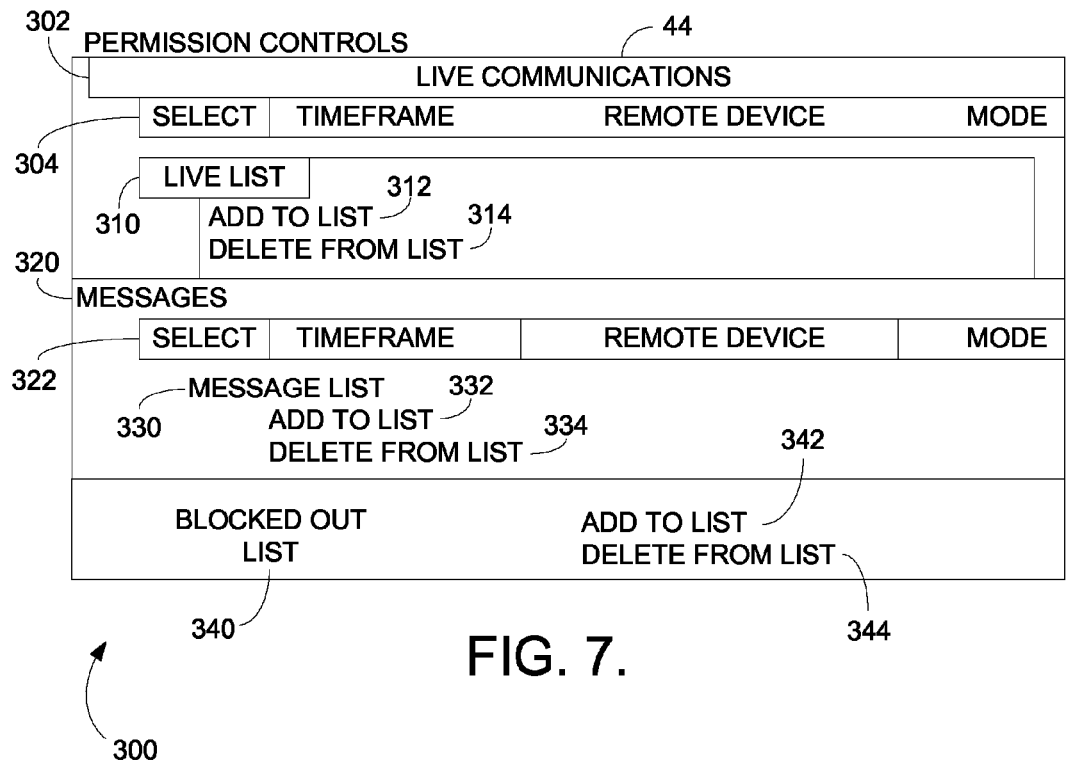
FIG. 7 is a block diagram illustrating permission controls of the individual identity management system in accordance with an embodiment of the invention.

FIG. 7 illustrates an embodiment for implementing the permission controls 44. The permission controls 44 serve as identity access tools. Live communications settings 302 may include a selection bar 304 for designating a time frame, a remote device, and a mode for receiving live communications. The live communications settings 302 may include a live list 310, which includes a list of contacts or other system users who have permission to make live contact. The system user may add contacts to the live list through the add-to-list function 312 or delete contacts using the delete-from-list function 314. Message communications may be controlled through message control section 320. The message control section 320 includes a selection bar 322 for selecting a time frame, a remote device, and a mode for message communications. A message list 330 allows a system user to control a list of other system users able to communicate through the use of messages. An add-to-list function 332 allows the system user to add system users to the list and a delete-from list function 334 allows the system user to delete users from the list. A blocked-out list 340 allows a system user to designate other system users who are not permitted to have contact with the system user. These individuals will neither be able to communicate live nor leave a message. Their communications will be blocked entirely. As described above, an add-to-list function 342 allows the system user to add contacts to the list and a delete-from-list function 344 allows a system user to delete names from the blocked-out list.

FIG. 8 shows an embodiment of an interface for use with the system of the invention. The user interface shows a plurality of contacts 400 and various information about each contact. The user may sort the contacts and display them by using a "view by" function 410. The view by function includes an A-Z selection 42 for allowing a system user to display contacts alphabetically, a family function 418 for allowing a user to view contacts that are family members, a friends function 420 for allowing a user to view contacts categorized as friends, a groups function 422 for allowing a user to view groups of contacts, and an "our gang" function 426 for allowing a user to view contacts in a pre-defined group "our gang". The "view by" function 410 also includes an appointment selection 414 for allowing a system user to view appointments and a date selection 416 for allowing a system user to sort by date. An exemplary use of the appointment function 414 is shown at 440. The "view by" function 410 also enables the user to select a display mode such as detail 428, list 430, and icon 432.

The user interface shown in FIG. 8 further includes a send message selection 450 that allows a system user to send a message to a contact. A call selection 460 allows a user to select a mode such as voice 462, video 464, or text 466.

Figure 9:
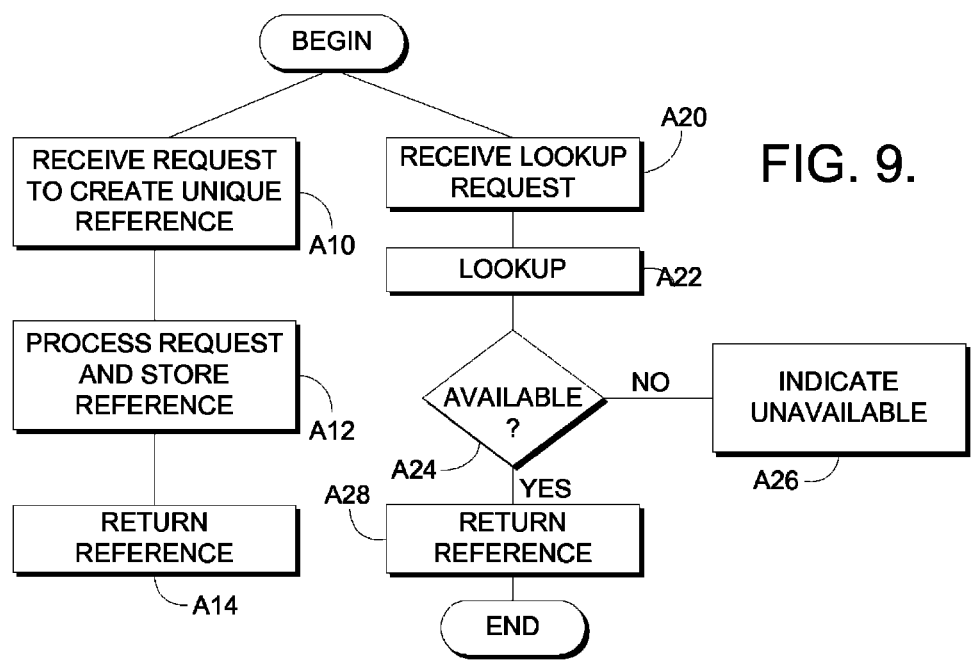
FIG. 9 is a flow chart showing steps for communicating with the centralized identity service in order to create a unique identity or locate an identity in accordance with an embodiment of the invention.

FIG. 9 is a flowchart showing communication between a system user and the centralized identity service and directory 50. In step A10, the centralized identity service 50 receives a request from a system user for assignment of a unique reference. In step A12, the centralized identity service 50 creates and stores the unique reference. In step A14, the centralized identity service 50 returns the unique reference to the system user requesting assignment of the reference.

FIG. 9 also shows the process for locating a reference for a contact. In step A20, the centralized identity service 50 receives a request for a reference from a system user. In step A22, the centralized identity service 50 looks up the reference. In step A24, the centralized identity service 50 determines if the requested reference is available. If the requested reference is unavailable, the centralized identity service 50 indicates this to the user in step A26. If the requested reference is available, the centralized identity service 50 returns the reference in step A28.

Figure 10:
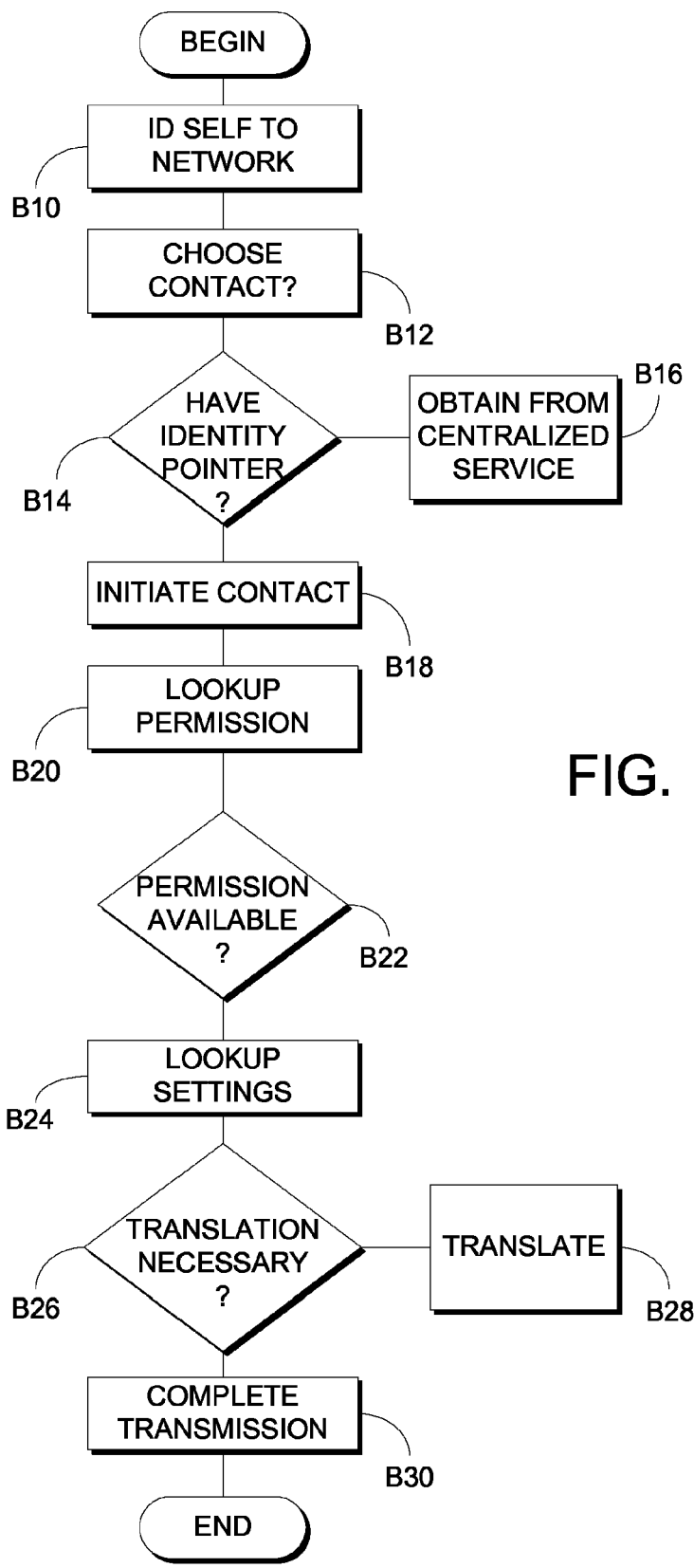
FIG. 10 is a flow chart illustrating a process for establishing communication using an embodiment of the system of the invention.

FIG. 10 is a flow chart illustrating the process of communication using the system of the invention. In step B10, a system user or sender attempting to initiate contact with another system user or recipient utilizes an individual identity management system 20 to initiate communication. The user identifies himself to the system in step B10 and chooses a contact in step B12. In step B14, the user will determine if he has the reference needed to make contact. If the user does not have the reference in step B14, the user can attempt to obtain the reference from the centralized identity service 50 in step B16. If the user does have the reference, the user initiates contact in step B18. Upon receiving the attempt to communicate, the centralized system 50 looks up the recipient's permissions in step B20. If permission is available, the centralized system 50 looks up settings in step B24. The settings include the preferences described above in reference to FIG. 6. If translation is necessary in step B26, the translation services 46 will accomplish the translation in step B28. With regard to the necessity for translation, the sender may attempt to contact the recipient by telephone. However, the recipient may have chosen to receive all of the sender's communications by electronic mail in text form. In this case, the translation service 46 would operate on the message to translate it to text form and leave it for the recipient as an email message. The system completes the transmission in step B30.

The present invention has been described in relation to particular embodiments, which are intended in all respects to be illustrative rather than restrictive. Alternative embodiments will become apparent to those skilled in the art to which the present invention pertains without departing from its scope. For instance, although the invention is described as having a centralized identity service 50 and individual identity management systems 20, these components could be combined into one service or distributed differently such that more system controls may be centrally located.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and with the scope of the claims.

We claim:

1. A method for providing electronic communications management capability for managing a unique identity owned by an identity owner, wherein the unique identity is accessible through an associated reference, the method comprising:
    providing, by way of a computing device having a processor and memory, identity access tools in the form of a permission control for allowing the identity owner to select a set of authorized identities that have rights to communicate with the identity owner;
    providing, by way of the computing device, device selection tools in the form of a preference control for allowing the identity owner, which is a recipient of communications from a particular authorized identity of the set of authorized identities, to select at least one electronic device from a plurality of electronic devices as identity components for reception of the communications from the particular authorized identity wherein the preference controls allow for the identity owner to select default methods for receiving communications; and
    allowing a message sender to control a sent message utilizing a transmission control.

2. The method of claim 1, further comprising maintaining a look-up table for locating unique references at the request of a system user.

3. The method of claim 1, further comprising allowing the identity owner to select a communication delivery method for a selected group of individuals.

4. The method of claim 1, further comprising receiving a message sent by the message sender, wherein the message sender is allowed to control a sent message, utilizing the transmission control, until a receiver processes the message, such that a sender may delete a sent message prior to processing.

5. The method of claim 3, wherein the method comprises allowing selection of a live communication delivery method for a first group of contacts and a message communication delivery method for a second group of contacts.

6. The method of claim 5, further comprising allowing the identity owner to block communication delivery from a third group of individuals.

7. The method of claim 1, further comprising allowing transmission of communication in a first mode and delivery of the communication in a second mode.

8. One or more computer storage media having computer-executable instructions embodied thereon, that when executed by a computing system having a processor and memory, cause the computing system to perform a method for facilitating electronic communications management by a system user, the method comprising:

permitting, with the processor, access to a unique identity belonging to the system user through a unique reference, wherein the unique identity comprises a plurality of identity components;

allowing the system user to alter any one of the identity components without altering the reference;

providing the system user with tools for regulating access to the identity components such that selected known identities have access to selected identity components; and allowing the system user, which is a recipient of communications from a particular known identity of the selected known identities, to select, utilizing a preference control, a particular communications delivery method for receiving the communications from the particular known identity using at least one selected identity component of the plurality of identity components;

defining a plurality of electronic devices as the identity components; and translating a communication transmission mode into the communication delivery mode if required.

9. The computer storage media of claim 8, wherein the method further comprises allowing the system user to select a communication delivery method for receiving communications from each known system user.

10. The computer storage media of claim 9, wherein the method further comprises allowing the system user to select an additional communication delivery method for unknown system users.

11. The computer storage media of claim 8, wherein the method further comprises allowing a first system user to select the communication transmission mode and allowing a second system user to select a communication delivery mode.

12. The computer storage media of claim 11, wherein the method further comprises translating the communication transmission mode into the communication delivery mode if required.

13. The computer storage media of claim 12, wherein the method further comprises providing video, audio, and text communication delivery modes and communication transmission modes.

14. A system including utilizing a processor and memory for allowing a user having a unique identity to manage communications, wherein the unique identity is associated with a plurality of electronic devices, the system comprising:

the processor, wherein the processor is functional to facilitate:

a service for assigning a reference to a user's unique identity, wherein other identities can access the user's unique identity only by using the reference;

permission controls for allowing the user to control access to the unique identity by restricting authorization to a selected set of other identities;

preference controls for allowing the user, which is a recipient of communications from a particular authorized user, to select at least one associated device from a plurality of associated devices for receiving the communication upon an access attempt by the particular authorized user;

identity component services for defining a plurality of electronic devices as the identity components; and translation services for translating from a communication transmission mode to a communication reception mode.

15. The system of claim 14, wherein the service is a centralized service comprising a directory for allowing system users to locate references for other system users.

16. The system of claim 14, wherein the permission controls further comprise tools for restricting a communication delivery method to one of live, message and blocked for each system user.

17. The system of claim 14, wherein the preference controls comprise tools for allowing selection of a communication reception mode and a communication transmission mode, wherein the communication reception and the communication transmission mode comprise at least audio and text modes.

* * * * *

UNITED STATES PATENT AND TRADEMARK OFFICE
CERTIFICATE OF CORRECTION

| | | |
|---|---|---|
| PATENT NO. | : 8,161,531 B2 | Page 1 of 1 |
| APPLICATION NO. | : 12/819789 | |
| DATED | : April 17, 2012 | |
| INVENTOR(S) | : Goldthwaite et al. | |

It is certified that error appears in the above-identified patent and that said Letters Patent is hereby corrected as shown below:

On the Title Page, Item [63], Related U.S. Application Data should read:

"Continuation of application No. 10/602,626, filed on June 25, 2003, now Pat. No. 7,774,823."

Signed and Sealed this
Eleventh Day of February, 2014

Michelle K. Lee
*Deputy Director of the United States Patent and Trademark Office*